Sept. 16, 1924.  
E. J. MORAN  
1,508,814  
APPARATUS FOR VULCANIZING TIRE LINERS AND THE LIKE  
Filed May 5, 1922
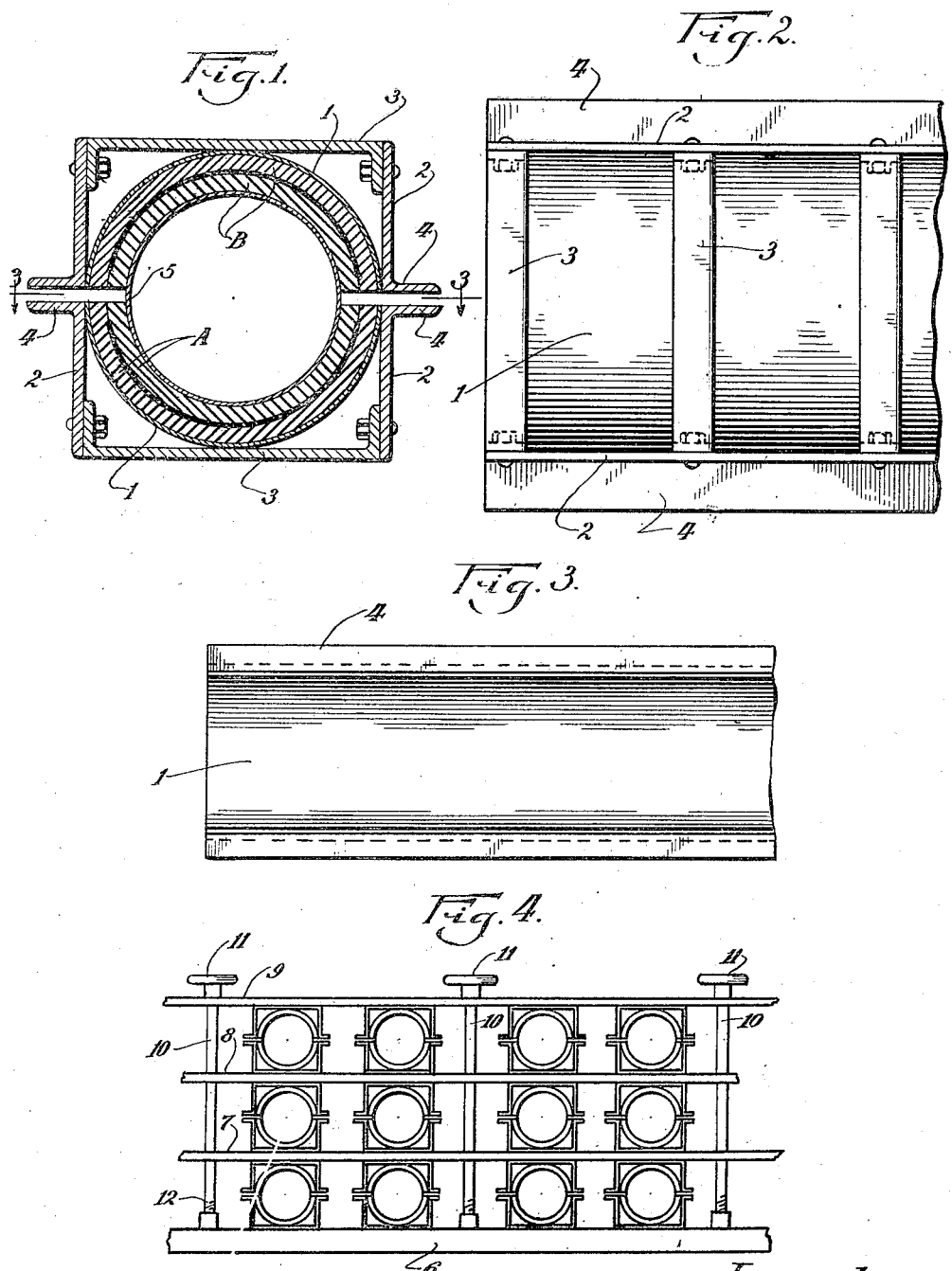

Patented Sept. 16, 1924.

1,508,814

UNITED STATES PATENT OFFICE.

EDWARD J. MORAN, OF CHICAGO, ILLINOIS.

APPARATUS FOR VULCANIZING TIRE LINERS AND THE LIKE.

Application filed May 5, 1922. Serial No. 558,681.

*To all whom it may concern:*

Be it known that I, EDWARD J. MORAN, a citizen of the United States, residing at Chicago, county of Cook, State of Illinois, have invented a certain new and useful Improvement in Apparatus for Vulcanizing Tire Liners and the like, and declare the following to be a full, clear, and exact description of the same, such as will enable others skilled in the art to which it pertains to make and use the same, reference being had to the accompanying drawings, which form a part of this specification.

The present invention relates particularly to the manufacture of liners for tires in which liners there are imbedded flexible metal reinforcing plates adapted to protect the inner tubes against puncture. These liners are made in the form of long flat strips composed of a plurality of layers of rubber between which the reinforcing plates are placed; and, after all of the parts are assembled, each liner must be vulcanized. The object of the present invention is to produce cheap, simple and novel apparatus whereby liners of the kind to which reference has been made may be vulcanized quickly and at a low cost.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a transverse section through one of the improved molds forming part of my invention;

Fig. 2 is a top plan view of one end of the mold shown in Fig. 1;

Fig. 3 is a bottom plan view of the upper half of the mold, or a top plan view of the lower half of the mold, on a smaller scale than Figs. 1 and 2; and Fig. 4 is an elevation of a fragment of the bed of a truck and a stack of molds supported thereon and ready to be carried by the truck into the vulcanizing furnace.

Referring to the drawing, 1 represents a semi-cylindrical trough-shaped member of comparatively thin sheet metal set in a suitable box or cradle which, in the arrangement shown, consists of two side walls 2, 2 connected together underneath the member 1 by means of cross pieces 3. The side walls are flanged outwardly at their upper edges, as indicated at 4, to provide hand-holds whereby the device may be lifted. The member 1 constitutes a mold the length of which is at least as great as the length of a liner to be vulcanized and the width of which, measured along a line following the curvature thereof, is at least as great as the width of the liner.

The liner to be vulcanized is laid in the mold as indicated at A in Fig. 1 and there is then laid upon the liner a long hollow cylinder 5 which may conveniently be made of sheet metal, and which has a diameter approximately equal to the diameter of the mold less twice the thickness of the liner. After the cylinder has been laid in the mold, a second liner, as indicated at B, is placed on top of the cylinder. A second mold is then placed upon the top of the cylinder and the liner carried thereby, the mold cavity in the upper mold facing downwardly. The two molds are then clamped together in any suitable way so that the liners are compressed between the two semi-cylindrical mold members and the central hollow cylinder; and in this condition the double mold may be placed in a suitable chamber which contains or through which is passed air of sufficient temperature to vulcanize the rubber. It will be seen that the head from the surrounding medium is effectively applied to the liners from both sides thereof; there being nothing between the liners and the heating medium except the thin walls of the molds and of the inner hollow cylinder, the openwork cradle or boxes for the molds permitting the heating medium to have free access to the outer surfaces of the semi-cylindrical mold members.

Where the liners are being manufactured in large quantities the double molds, when filled, may be stacked on a suitable truck; the clamping pressure may be applied to all of the molds simultaneously, and the truck may then be run into a hot chamber or furnace. In Fig. 4 I have illustrated this method of handling the filled molds; 6 representing the top or platform of a truck on which is placed a row of double filled molds. On this row of molds are laid a number of cross bars 7 upon which another row or layer of double molds is placed. A second set of cros bars or pieces 8 may be placed on the second layer of molds and a third layer of molds may be placed on the bars 8. Across the top of the uppermost layer of molds are placed bars 9 through which extend rods 10 connected with the bed or platform of the truck and provided with adjusting screw threads whereby a clamping pressure on all of the molds may be obtained. In the arrangement shown, each rod is provided with a handle 11 at the upper end while at the bottom it is provided with a screw threaded portion adapted to be screwed into a suitable socket or nut carried by the truck.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A multiple mold for vulcanizing tireliners comprising two semi-cylindrical sheet metal troughs housed in openwork cradles, and a sheet metal open-ended cylinder somewhat smaller in diameter than said troughs.

2. A multiple mold for vulcanizing tireliners comprising two semi-cylindrical sheet metal troughs, each trough being housed in a cradle which affords a free space bounded by the concave side of the trough, and a sheet metal open-ended cylinder somewhat smaller in diameter than said troughs.

In testimony whereof, I sign this specification.

EDWARD J. MORAN.